UNITED STATES PATENT OFFICE.

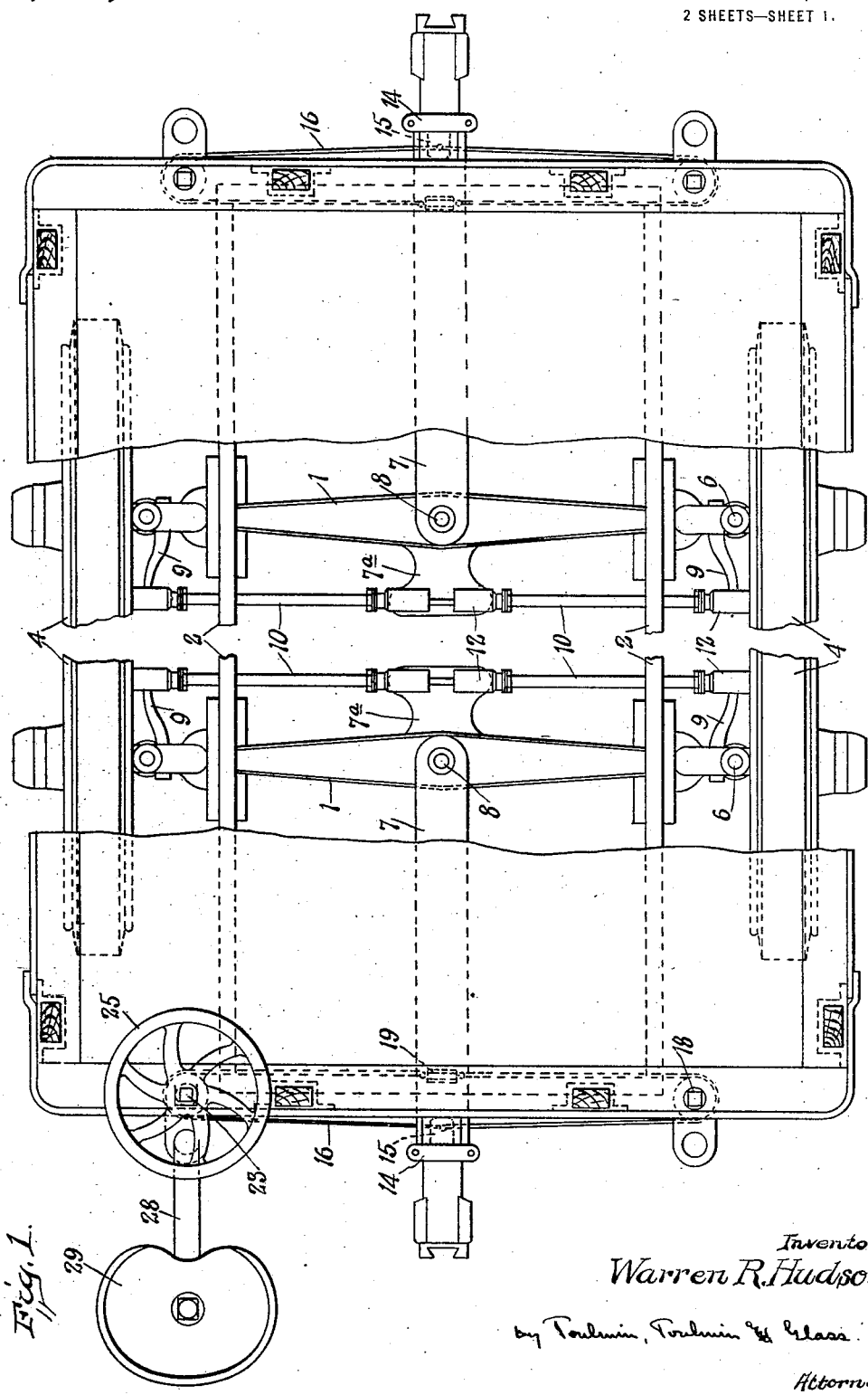

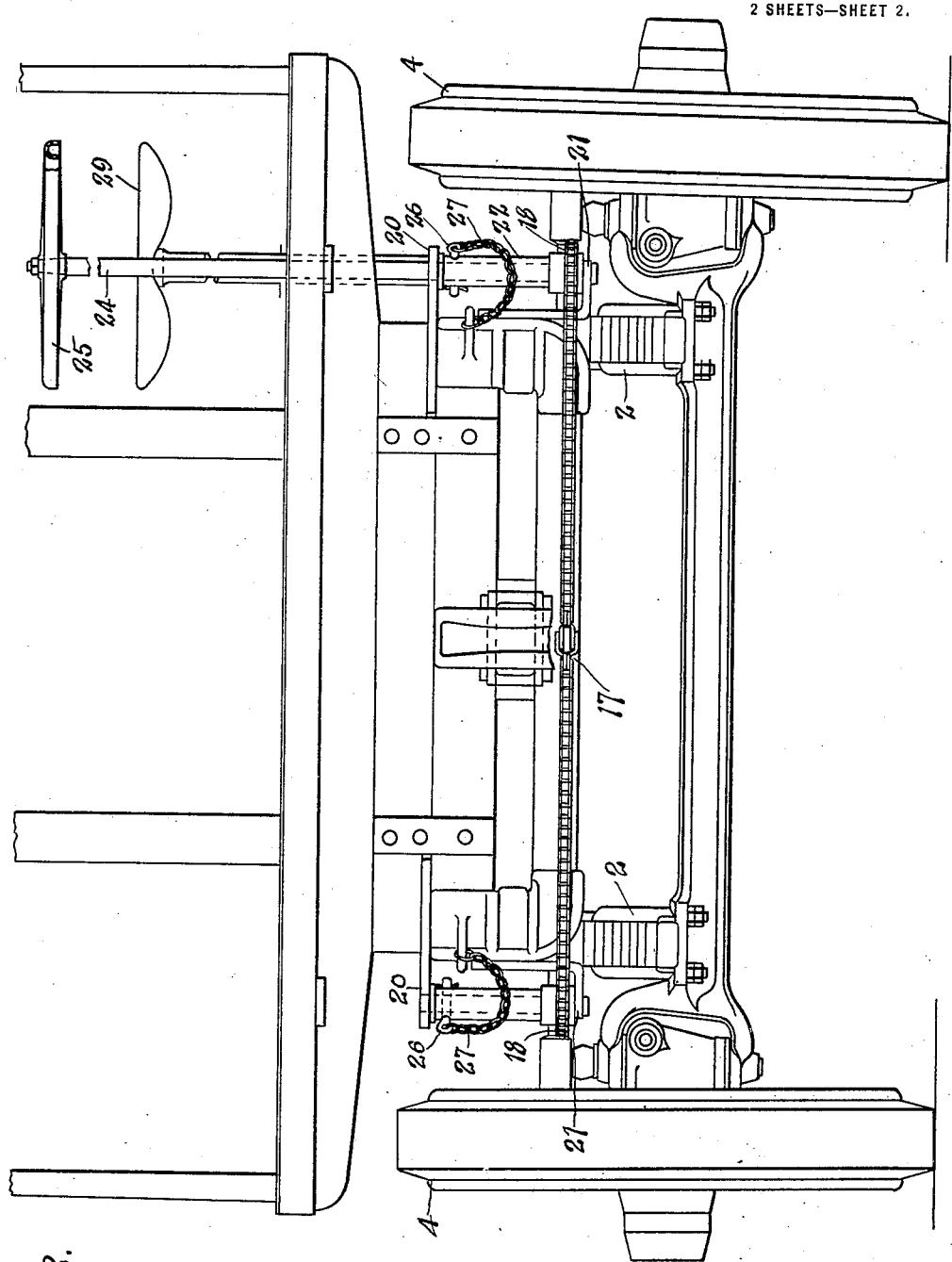

WARREN R. HUDSON, OF TROY, OHIO, ASSIGNOR TO THE TROY WAGON WORKS COMPANY, OF TROY, OHIO, A CORPORATION OF OHIO.

TRAILING VEHICLE.

1,321,449.   Specification of Letters Patent.   Patented Nov. 11, 1919.

Application filed March 30, 1918. Serial No. 225,718.

*To all whom it may concern:*

Be it known that I, WARREN R. HUDSON, a citizen of the United States, residing at Troy, in the county of Miami and State of Ohio, have invented certain new and useful Improvements in Trailing Vehicles, of which the following is a specification, reference being had therein to the accompanying drawing.

This invention relates to trailing vehicles and particularly to a well known form of such devices adapted to be hauled by automobile trucks. It aims to provide an improved method of steering such trailing trucks, especially adapted to long vehicles which are not readily turned.

The construction disclosed provides a double ended truck which may be moved in either direction, each end of the truck being provided with a draft bar which has connections to turn the corresponding pair of wheels. In use the draft bar at the rear of the truck may be locked in central position and the steering done by the front pair of wheels. If the truck is to be moved in the reverse direction then the draft bar at what has been the forward end may be similarly locked in central position and the draft bar at the other end unlocked, whereby the vehicle may be steered from that end which then, of course, becomes the front end of the vehicle.

This double steering arrangement has hitherto gone into use and the improvement constituting this invention consists of means, whereby both pairs of wheels may be turned to cause an easier steering of a long truck. To this end the draft bars are provided with chains which pass around sprockets adjacent the corners of the truck and into any one of the four sprockets a steering shaft may be inserted so as to turn it and thereby move the corresponding pair of wheels. In use the draft bar at the forward end of the vehicle turns the forward pair of wheels in the usual manner and an operator at the rear end of the vehicle may turn the rear pair of wheels by the mechanism just described, thereby aiding the driver of the leading truck in steering the train of vehicles.

The adjustability of the steering shaft and steering wheel to any one of the four corners of the trailing truck provides for the operator sitting in proper position so that he may see the driver of the leading truck no matter in which direction the train of vehicles is moving.

In the drawings:

Figure 1 is a top plan view of a trailing truck to which the invention is shown as applied, the central portion of the truck being broken away; and Fig. 2 is an end elevation of the truck, showing the steering shaft wheel in operative position.

A prior patent to the present inventor, No. 1,214,037, granted Jany. 30, 1917, shows a practical method of steering trailing trucks and the construction here shown is similar to that of the patent to which reference may be made for a fuller description.

The draft bar 7, referring to Fig. 1, is pivoted at the point 8 to a cross bar 1 of the vehicle frame 2 and has a rearward extension 7ª thereof, connected through drag links 10 to steering arms 9. These posts serve to turn the wheels 4 which are mounted on trunnions 6 and any desired form of connection 12 between the steering arms 9 and the drag links 10 may be employed. Clearly the turning of the draft bar 7 around its pivot 8 serves to turn the corresponding pair of wheels 4, whereby to steer the vehicle. Fig. 1 shows a double ended truck having two draft bars 7 and related parts, and in the former patent the construction was such that the particular draft bar 7 at the rear end of the truck was locked in its normal central position. This method of steering is entirely satisfactory with short trucks but with long trucks now in use it is improved by a method whereby all four wheels of the truck may be employed in steering.

Each draft bar 7 is provided with a bracket 14 just outside the truck frame, the bracket having under the draft bar a rearwardly projecting plate 15 to which is fastened a chain 16. As shown, the connection is through spaced plates 17, but any desired method of connecting the chain 16 to the draft bar 7 may be employed. The chain passes around sprockets 18 adjacent the corners of the truck and its ends are connected by a turn buckle 19 of any desired construction, whereby the chain may be tightened if necessary.

Referring to Fig. 2, it will be seen that upper plates 20 and lower plates 21 project from the vehicle frame and between these plates and journaled in them is a sleeve 22, this sleeve being fast to the sprocket 18 and provided with a squared aperture 23 shown in Fig. 1 and passing longitudinally through the sleeve 22 and the sprocket 18. It will be understood that the sleeve 22 is journaled in holes in the plates 20 and 21 resting on the lower plate 21.

A square steering post 24 passes inside the sleeve 22, being supported at its lower end by a collar inside the sleeve or in any other desired way, and this steering post is surmounted by any desired form of steering mechanism, such as a wheel 25. In order to prevent jarring of the steering post due to the vibration of the truck, a pin 26 is passed completely through the sleeve 22 and the steering post 24, it being shown as fastened to a chain 27, this being, of course, merely to prevent it from being mislaid. The pin 26 has no function in causing the turning of the shaft 24 because of the square cross section of this shaft and of the sleeve 22. Its only function is to prevent the jarring mentioned.

A seat post 28 is also mounted near the corner of the truck, being surmounted by a seat 29. As a matter of construction the seat post 28 and the steering post 24 may be connected together so that they may be both removed from the corner of the vehicle at the same time.

As the parts are shown in Fig. 1 the trailing truck is being drawn toward the right and the driver of the leading truck is on the left hand side thereof. This leading truck is not shown in the drawings, but it will be understood that the steersman of the trailing truck is positioned on the same side thereof as the driver of the leading truck. As long as the trailing vehicle is moving forward in a straight line the parts remain in the position of Fig. 1, but if a curve is reached the steersman turns the steering wheel 25 in the proper direction, thus through the steering post 24, sleeve 22 and sprocket 18 moving the chain 16 and thus adjusting the draft bar 7 around its pivot 8. This, of course, turns the rear pair of wheels of the trailing truck so as to aid the front pair in properly steering the vehicle.

If a right hand drive leading truck is employed then the steering post 24 and wheel 25 would be moved to the left hand side of the vehicle and inserted in the corresponding sleeve 22. If the truck is to be moved in the opposite direction, that is, toward the left in Fig. 1, the steering wheel and post and the seat mechanism are moved to the right hand end of the truck and they are employed on the side corresponding to the driver's side of the leading truck.

It will be seen that this construction is simple and rugged and well adapted to the hard usage given automobile trailing trucks. The adjustable parts, namely, the steering post and wheel and the seat mechanism may be readily moved to any corner of the truck and the adjacent pair of wheels readily steered.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a trailer, the combination, with a frame and supporting wheels pivotally attached thereto, a draft bar at each end of the frame, having connections to turn one pair of said wheels and adapted to connect the trailer to a leading vehicle, connections at each end of said frame for operating the draft bars independently of each other, and detachable operating means whereby said connections may be operated from a plurality of positions.

2. In a trailer, the combination, with a frame and supporting wheels pivoted thereto, of a draft bar pivoted to a frame element and having connections to turn said wheels, two plates fast to each corner of the frame, a sleeve journaled at its ends in each pair of said plates, said sleeve having a square aperture extending longitudinally therethrough, a sprocket wheel carried fast on one end of said sleeve, a square shaft adapted to be inserted in the aperture of each sleeve, a steering device fast to said squared shaft, a chain passing around said sprocket and fast to said draft bar, and a removable pin passing through the sleeve and the squared shaft to prevent relative longitudinal movement thereof.

3. In a trailer, the combination, with a frame and supporting wheels pivoted thereto, of a draft bar pivoted to a frame element and having connections to turn said wheels, two plates fast to each corner of the frame, a sleeve journaled at its ends in each pair of said plates, said sleeve having a square aperture extending longitudinally therethrough, a sprocket wheel carried fast on one end of said sleeve, a square shaft adapted to be inserted in the aperture of either sleeve, a steering device fast to said squared shaft, and a chain passing around said sprocket and fast to said draft bar.

In testimony whereof I affix my signature.

WARREN R. HUDSON.